United States Patent
Seki et al.

[11] Patent Number: 6,152,415
[45] Date of Patent: Nov. 28, 2000

[54] SEAT SLIDE DEVICE FOR AUTOMOTIVE VEHICLES

[75] Inventors: Hiromi Seki; Yoshinori Sugawara, both of Utsunomiya; Masahiro Tomida, Komaki; Mitsunao Komura, Motosu-Gun, all of Japan

[73] Assignee: Kabushiki Kaisha Imasen Denki Seisakus Ho, Inuyama, Japan

[21] Appl. No.: 09/299,589

[22] Filed: Apr. 27, 1999

[30] Foreign Application Priority Data

Sep. 29, 1998 [JP] Japan .................. 10-274673

[51] Int. Cl.⁷ .............................. F16M 13/00; B60N 2/08
[52] U.S. Cl. .................................................. 248/430
[58] Field of Search ........................... 297/311, 344.1; 248/429, 430

[56] References Cited

U.S. PATENT DOCUMENTS

| | | | |
|---|---|---|---|
| 3,204,916 | 9/1965 | Pickles | 248/429 |
| 3,917,342 | 11/1975 | Furuta | 248/429 X |
| 4,209,159 | 6/1980 | Becker et al. | 248/430 |
| 4,695,097 | 9/1987 | Muraishi | 248/429 X |
| 4,775,126 | 10/1988 | Yokoyama | 248/430 |
| 4,821,991 | 4/1989 | Aihara et al. | 248/430 |
| 5,011,209 | 4/1991 | Takarabe et al. | 248/430 X |
| 5,183,234 | 2/1993 | Saito | 248/430 |
| 5,529,378 | 6/1996 | Chaban et al. | 297/344.1 X |
| 5,740,999 | 4/1998 | Yamada | 248/429 |
| 5,882,074 | 3/1999 | Kojima | 297/344.1 X |
| 6,007,040 | 12/1999 | Matsumoto et al. | 248/429 |

FOREIGN PATENT DOCUMENTS

| | | | |
|---|---|---|---|
| 0765777 | 4/1997 | European Pat. Off. | 248/430 |
| 2721866 | 1/1996 | France | 248/429 |
| 3226585 | 1/1984 | Germany | 248/430 |
| 19732853 | 2/1998 | Germany | 297/344.1 X |
| 62-178450 | 8/1987 | Japan | 248/430 |
| 9-48268 | 2/1997 | Japan . | |

Primary Examiner—Carl D. Friedman
Assistant Examiner—David E. Allred
Attorney, Agent, or Firm—Jacobson, Price, Holman & Stern, PLLC

[57] ABSTRACT

A seat slide device for automotive vehicles including a lower rail to be fixed to a floor panel of an automotive vehicle, an upper rail slidably fitted to the lower rail, a lock plate capable of locking, at a desired position, a sliding movement of the upper rail in which the lock plate is pivotally supported by the upper rail, and a seat bracket for fixing a seat cushion which is secured to the upper rail. The lower rail includes, when viewed in a direction of an end face thereof, two side wall portions bent upwardly from two sides of a bottom wall portion, top wall portions bent inwardly in mutually opposing directions like a fishing hook from upper ends of the side wall portions, and vertically-downwardly extending wall portions. The upper rail includes a pair of generally L-shaped plates each of which includes a horizontal wall portion which is bent like a fishing hook from a lower end portion of a vertical wall portion and a raised wall portion. The pair of L-shaped plates being abutted with each other at the back sides of the vertical wall portions and fixed together to form a vertical wall unit. The vertical wall unit of the upper rail is situated at a central portion of a space formed between the opposing downwardly-extended wall portions of the lower rail and the raised walls being situated in spatial areas formed between the side wall portions and the downwardly-extended wall portions.

2 Claims, 3 Drawing Sheets

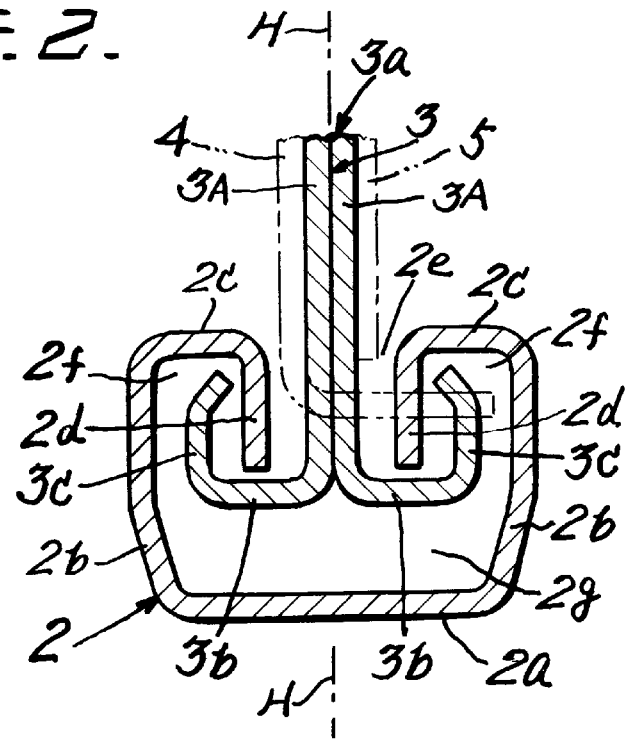
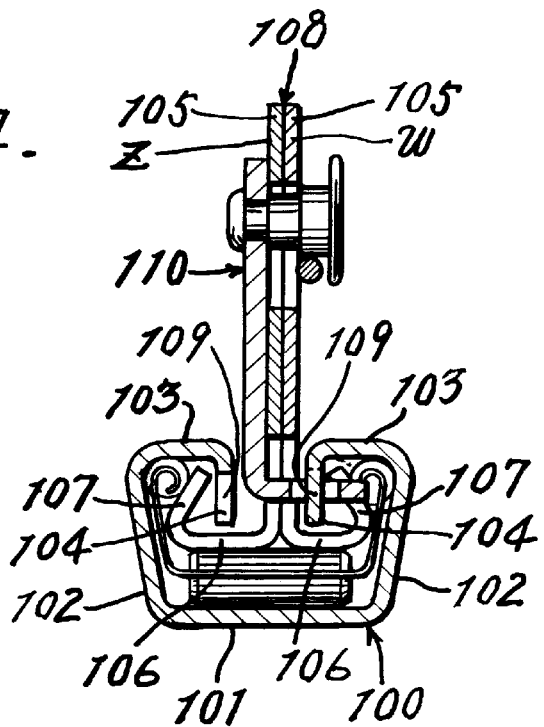

SEAT SLIDE DEVICE FOR AUTOMOTIVE VEHICLES

BACKGROUND OF THE INVENTION

This invention relates to a seat drive device suitable for use in automotive vehicles.

There is known a seat slide device for automotive vehicles as disclosed in Japanese Patent Unexamined Publication (Kokai) No. Hei 9-48268. This conventional seat slide device for automotive vehicles comprises, as shown in FIG. 4, a lower rail 100 having a generally U-shaped configuration when viewed in a direction of an end view thereof and an upper rail 108 and a generally L-shaped configuration. The lower rail 100 includes side wall portions 102 formed by bending two side portions of a horizontal bottom wall portion 101 upwardly, a top wall portion 103 formed by bending upper end portions of the side wall portions 102 inwardly in opposing directions like a fishing hook, and vertically downwardly-extended wall portions 104. The upper rail 108 is comprised of a pair of generally L-shaped plates W, Z each of which includes a horizontal wall portion 106 which is bent like a fishing hook from a lower end portion of a vertical wall portion 105 and a raised wall portion 107, the pair of L-shaped plates W, Z being abutted with each other at the back sides of the vertical wall portions 105 and formed as one piece. The upper rail is slidably fitted to the lower rail such that the raised wall portions 107 of the upper rail 108 are located between the side wall portions 102 of the lower rail 100 and the downwardly-extended wall portions 104. A lock plate 110 capable of engaging one of the engagement toothed portions 109 formed on the downwardly-extended wall portions 104 of the lower rail is abutted with one side surface of the vertical wall portion 105 so that an upper portion of the vertical wall portion 105 of one W of the L-shaped plates constituting the upper rail 108 can be served also as a seat cushion attachment bracket.

Such a seat slide device of rail type having a T-shaped configuration in section is demanded to have such features that from a view point of obtaining physical strength, it has, when viewed in a direction of an end face thereof, a laterally symmetrical configuration with respect to a vertical center line, the upper rail and the lock plate abutted with the upper rail are located in a central position of the lower rail, and there is adopted such an impact-load countermeasure applicable to the seat belt attachment portion when a vehicle collision or the like occurs that an engagement portion between the engagement toothed portion formed on the lower rail and the lock plate is located outwardly of the vertical center line serving as a fulcrum.

In order to fulfill the above demands, the prior art device adopted the following impact-load countermeasure. The width of the lower rail and the distance between the two downwardly-extended wall portions of the lower rail are reduced. The upper rail and the lock plate abutted with the upper rail are located in the central position of the lower rail, and a portion of the horizontal wall portion of the upper rail where the lock plate is engaged with the engagement toothed portion of the lower rail is formed short.

However, the above prior art device has the following inconveniences. Since the two horizontal walls of the L-shaped plates of the upper rail are different in length, the horizontal wall portion having a longer length dimension is readily warped and susceptible to one-sided deformation. Since the lower rail is reduced in width, machining and assembling work is disturbed. Moreover, since the two L-shaped plates are different in configuration and one of the L-shaped plates is served also as a seat attachment bracket, they must be separately made at the left and right sides of the seat and therefore, favorable productivity is difficult to obtain.

SUMMARY OF THE INVENTION

It is, therefore, an object of the present invention to provide a seat slide device for automotive vehicles having such features that from view point of a common provision on both left and right sides of a vehicle seat and obtaining physical strength, the upper and lower rails are laterally symmetrically formed with respect to the vertical center line, those three members are located in a central position of the lower rail, and there is adopted such an impact-load countermeasure applicable to the seat belt attachment portion when a vehicle collision or the like occurs that an engagement portion between the engagement toothed portion formed on the lower rail and the lock plate is located outwardly of the vertical center line serving as a fulcrum.

In a seat slide device for automotive vehicles according to the present invention, vertical wall portions having, when viewed in a direction of an end face thereof, a laterally symmetrical configuration with respect to a vertical center line are located at the center of a space formed between two downwardly-extended wall portions of the lower rail which have likewise a laterally symmetrical configuration and slidably fitted thereto.

A lock plate capable of locking a sliding movement of the upper rail at a desired position is pivotally supported on a seat side surface of the vertical wall portion of the upper rail, a seat bracket for fixing a seat cushion to the other side surface, and those three members (the lock plate, the upper rail and the seat bracket) are located in a central position of a space formed between the downwardly-extended wall portions of the lower rail.

The seat bracket includes a seat belt attachment hole formed in a position on a generally same vertical plane as an engagement portion where the lock plate of the upper plate and the engagement toothed portion of the lower rail are engaged with each other.

BRIEF DESCRIPTION OF THE DRAWING

FIG. 2 is an enlarged end view showing a fitted state between a lower rail and an upper rail;

FIG. 4 is a sectional view showing a fitted state between a lower rail and an upper rail in a conventional slide device for automotive vehicles.

BEST MODE FOR CARRYING OUT THE INVENTION

Figure 1:
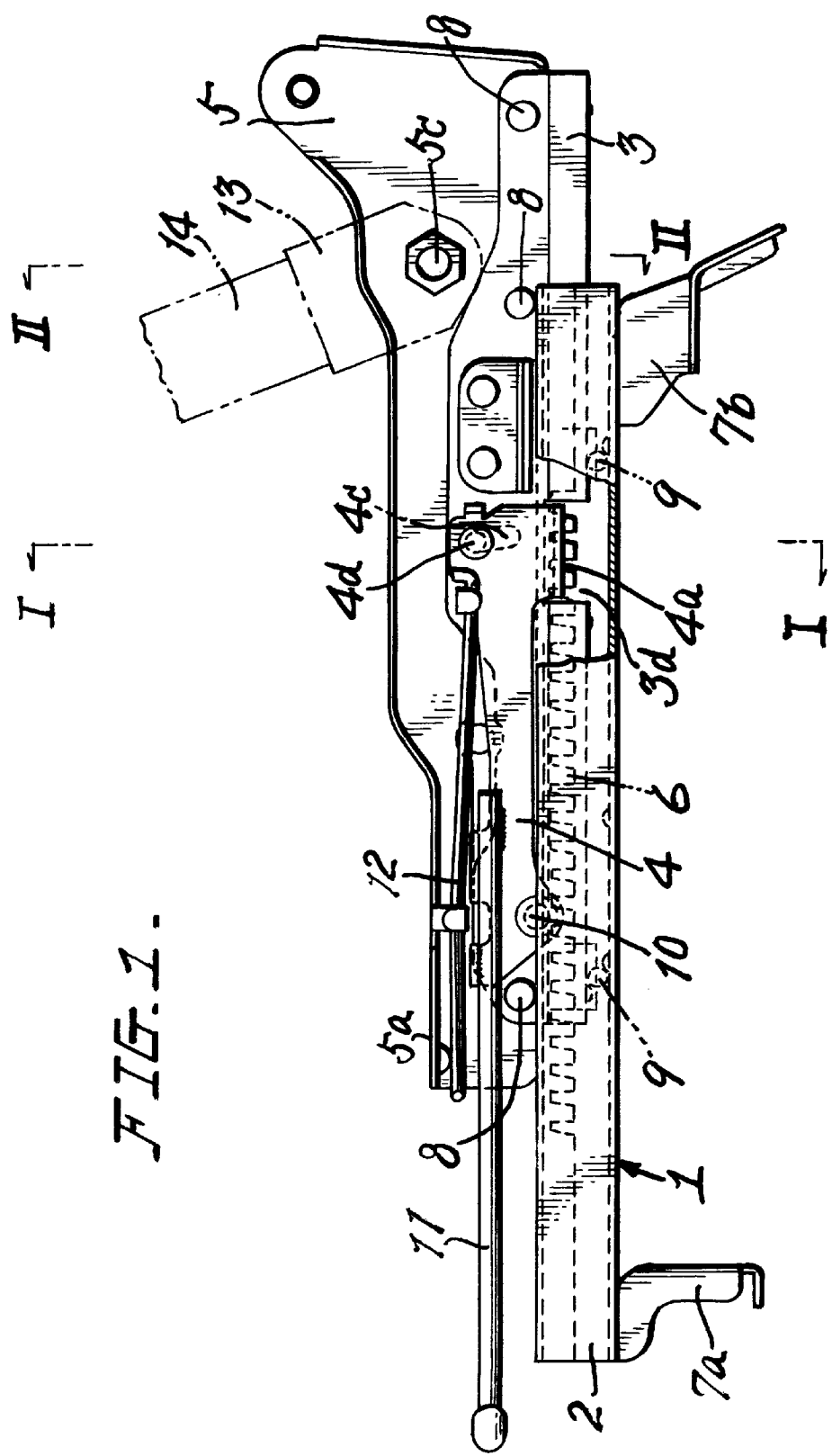
FIG. 1 is a side view of a seat slide device for automotive vehicles.

In the drawing, reference numeral 1 denotes a seat drive device for automotive vehicles. The seat slide device 1 includes a lower rail 2 fitted to a floor panel of automotive vehicles, an upper rail 3 slidably fitted to the lower rail, a lock plate 4 pivotably supported by the upper rail 3 and adapted to lock the upper rail 3 in a desired position during its sliding movement, and a seat bracket 5 for fixing a seat cushion S which is secured to the upper rail 3.

The lower rail 2 includes a horizontal bottom wall portion 2a when viewed in a direction of an end face thereof, two side wall portions 2b, 2b bent upwardly from two sides of a bottom wall portion 2a, top wall portions 2c, 2c bent inwardly (in mutually opposing directions) like a fishing hook from upper ends of the side wall portions 2b, 2b, and vertically-downwardly extending wall portions 2d, 2d. The vertically-downwardly extending wall portions 2d, 2d are in opposing relation to each other with a space 2e therebetween. The vertically-downwardly extending wall portions 2d, 2d each exhibit a generally laterally symmetrical U-shaped configuration with respect to an imaginary vertical center line H, having spatial areas 2f, 2f surrounded by the top wall portions 2c, 2c continuous with the side wall portions 2b, 2b and the vertically-downwardly extending wall portions 2d, 2d, and a spatial area 2g between lower ends of the vertically-downwardly extending wall portions 2d, 2d and the bottom wall portion 2a opposing the lower ends. The vertically-downwardly extending wall portions 2d, 2d are provided at longitudinal portions of lower ends thereof with engagement toothed portions 6, 6 having continuous irregularities. A front floor bracket 7a and a rear floor bracket 7b are secured to longitudinal opposite end portions of a lower surface of the bottom wall portion 2a. The front and rear floor brackets 7a, 7b are adapted to fix the lower rail 2 to the floor panel.

The upper rail 3 is comprised of a pair of generally L-shaped plates each of which includes a horizontal wall portion 3b which is, when viewed in a direction of an end face of the upper rail 3, bent like a fishing hook from a lower end portion of a vertical wall portion 3A and a raised wall portion 3c. The pair of L-shaped plates are abutted with each other at the back sides of the vertical wall portions 3A and formed, as one piece, into a vertical wall unit 3a by a rivet 8. Thus, the upper rail 3 is, when viewed in a direction of its end face, laterally symmetrical with respect to an imaginary vertical center line H. The vertical wall unit 3a is situated at a central portion of a space formed between the opposing downwardly-extended wall portions 2d, 2d of the lower rail 2, the horizontal wall portions 3b, 3b are situated in the spatial area 2g, and the raised walls 3c, 3c are situated in the spatial areas 2f, 2f. A ball member 9a and a roller 9b are engaged with each other through a roll medium 9 supported on a support plate 9c. Owing to this arrangement, the upper rail 3 is longitudinally slidably supported by the lower rail 2.

Figure 3A:
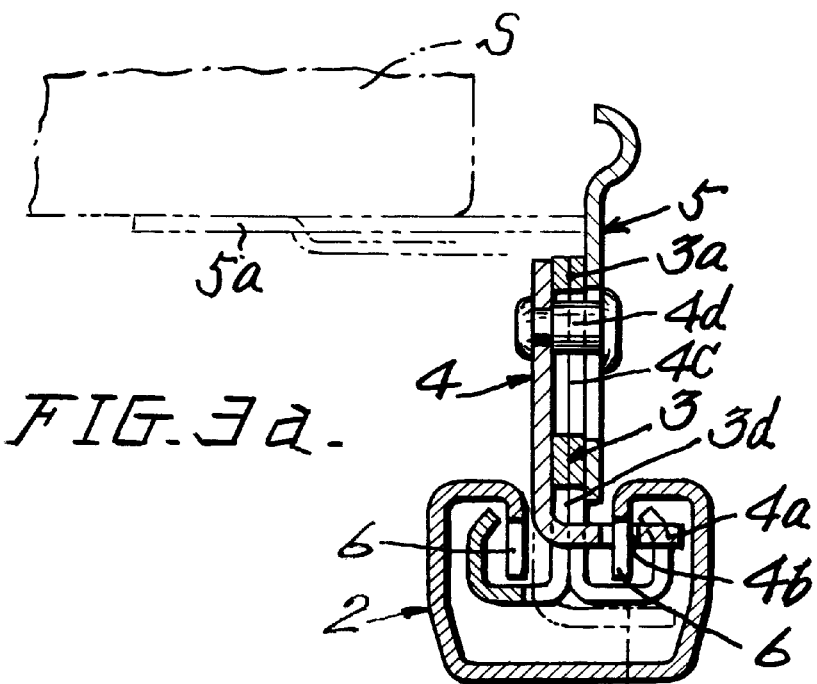
FIG. 3a is a sectional view taken on line I—I of FIG. 1.

The lock plate 4 is disposed, in abutment relation, along the seat side surface (left side and inner side in the illustration) of the vertical wall unit 3a of the upper rail 3. A longitudinal distal end portion of the lock plate 4 is pivotably supported on a front portion of the upper rail 3 through a pin 10. A basal end of a forwardly extending control lever 11 is secured to the lock plate 4. A rear end portion of the lock plate 4, which is located in a longitudinal generally central position of the upper rail 3, is bent towards the other side of the seat (right side and outer side in FIG. 3a) like an L-shaped configuration and located within a cutout 3d formed in a generally central area of the upper rail 3 and provided with an engagement piece 4a whose distal end is situated in an outer spatial area 2f of the lower rail 2. The engagement piece 4a is provided with an engagement hole 4b engageable with an engagement toothed portion 6 formed on the outer downwardly-extended wall portion 2d.

Between the lock plate 4 and a seat bracket 5 as later described, there is a provision of a rod-like spring 12. This rod-like spring 12 is attached at a distal end thereof to the lock plate 4 and at a basal end to the seat bracket 5 and adapted to bias the engagement piece 4a towards the engagement toothed portion 6 formed on the downwardly-extended wall portion 2d of the lower rail 2. By this, an engagement relation between the engagement hole 4b and the engagement toothed portion 6 is normally maintained. At an upper location of the engagement portion, there is a provision of an annular restriction hole 4c about a pivot pin 4d of the lock plate 4. By inserting the pin 4d secured to the lock plate 4 into the restriction hole 4c, a pivoting angle of the lock plate 4 can be restricted.

Owing to the above arrangement, when the control lever 11 is lifted up against the effect of the rod-like spring 12, the lock plate 4 is pivoted downwardly about the pivot pin 10 along the restriction hole 4c with the restriction pin 4d inserted therein, to bring the engagement hole 4b of the engagement piece 4a out of engagement from the engagement toothed portion 6 formed on the downwardly-extended portion 2d of the lower rail 2, thereby allowing sliding movements of the lower and upper rails 2, 3. When the control lever 1 is released, the lock plate 4 is returned under the effect of the rod-like spring 12 to thereby bring the engagement hole 4 into engagement with the engagement toothed portion 6. As a result, a sliding movement of the upper rail 3 can be locked in a desired position.

Figure 3B:
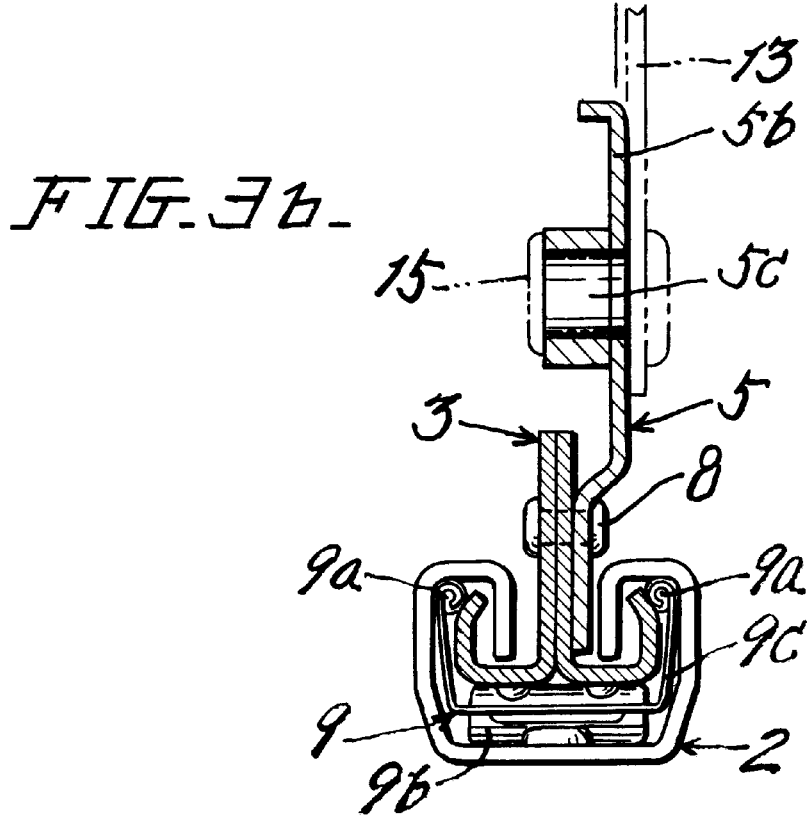
FIG. 3b is a sectional view taken on line II—II of FIG. 1.

The seat bracket 5 is secured, in abutment relation, to the other side (right side and outer side in FIGS. 3a and 3b) of the vertical wall unit 3a of the upper rail 3 (which other side is confronted with the lock plate 4), by a rivet 8. The seat bracket 5 is provided on a longitudinal front upper side portion thereof with an attachment piece 5a which is bent towards the seat side (inner side) and adapted to attach a seat cushion S. The seat bracket 5 is provided on a rear portion thereof with an engagement piece 4a whose upper portion is steppingly bent towards the other side (outer side) of the seat disposed in the engagement piece 4a of the lock plate 4 and a vertical portion 5b which is located on a generally same vertical plane as the engagement portion with respect to the engagement toothed portion 6 of the lower rail 2. This vertical portion 5b is provided with an attachment hole 5c for a seat belt metal 13. The seat belt metal 13 secured to the seat belt 14 is attached to the attachment hole 5c through the pin 15.

By this, the slide device 1 is constituted, in which both the lower rail 2 and the upper rail 3 are laterally symmetrically formed. And the lock plate 4 is disposed, in abutment relation, on the seat side (inner side) of the vertical wall unit 3a of the upper rail 3, and the seat bracket 5 is disposed, in abutment relation, on the other side (outer side). Those three members are located in the center of the space 2e formed between the two downwardly-extended wall portions 2d, 2d of the lower rail 2. The attachment position of the seat belt 14 attached to the outer side of the seat bracket 5 is located on a generally same vertical plane as the engagement portion between the engagement hole 4b of the lock plate 4 and the engagement toothed portion 6 of the lower rail 2.

The above seat slide device for automotive vehicles is such constructed that the vertical wall unit 3a of the upper rail 3 having, when viewed in a direction of an end face thereof, a laterally symmetrical configuration with respect to an imaginary vertical center line H is located in the center of the space 2e formed between the two downwardly-extended wall portions 2d, 2d of the lower rail 2 which is likewise laterally symmetrically formed and slidably fitted thereto, the lock plate 4 for locking the sliding movement of the upper rail 3 at a desired position is pivotably supported on the seat side surface of the vertical wall unit 3a of the upper rail 3, the seat bracket 5 for fixing the seat cushion is secured to the other side surface of the vertical wall unit 3a, and the seat bracket 5 is provided with the attachment hole 5c for attaching the seat belt 14, on a portion thereof, which portion is located on a generally same vertical plane as the engagement portion which is brought into engagement with the engagement toothed portion 6 of the lower rail 2 by a pivotal movement of the lock plate 4. Accordingly, the engagement portion between the lock plate 4 and the lower rail 2 subjected to an impact-load applicable to the seat belt 14 when a vehicle collision occurs, is located on a generally same vertical plane as the attachment hole 5c of the seat belt 14. Moreover, the seat bracket 5 for attaching the seat belt 14 has a three-members abutment structure consisting of the seat bracket 5, the upper rail 3 and the lock plate 4. Accordingly, it can sufficiently stand with the impact-load. Since both the upper and lower rails 3, 2 forming a basic portion of the slide device 1 are laterally symmetrically formed, they can be commonly used as a slide device good for use on both left and right sides of the seat.

What is claimed is:

1. A seat slide device for automotive vehicles comprising a lower rail to be fixed to a floor panel of an automotive vehicle, an upper rail slidably fitted to said lower rail, a lock plate capable of locking, at a desired position, a sliding movement of said upper rail, said lock plate being pivotally supported by said upper rail and including an engagement piece portion, and a seat bracket for fixing a seat cushion, said seat bracket being secured to said upper rail, said lower rail including, when viewed in a direction of an end face thereof, two side wall portions bent upwardly from two sides of a bottom wall portion, top wall portions bent inwardly in mutually opposing directions like a fishing hook from upper ends of said side wall portions, and vertically-downwardly extending wall portions comprising an engagement toothed portion, said lower rail exhibiting a generally laterally symmetrical configuration with respect to an imaginary vertical center line, said upper rail being comprised of a pair of generally L-shaped plates each of which includes a horizontal wall portion which is bent like a fishing hook from a lower end portion of a vertical wall portion and a raised wall portion, said pair of L-shaped plates being abutted with each other at back sides of said vertical wall portions and fixed together to form, into a vertical wall unit, said upper rail exhibiting a laterally symmetrical configuration with respect to the imaginary vertical center line, said vertical wall unit of said upper rail being situated at a central portion of a space formed between said opposing downwardly-extended wall portions of said lower rail and said raised walls being situated in spatial areas formed between said side wall portions and said downwardly-extended wall portions, said upper rail being longitudinally slidably fitted to said lower rail, said upper rail being provided with said lock plate pivotably supported on a seat side surface of said vertical wall unit and adapted to lock a sliding movement of said upper rail at a desired position, and a seat bracket secured to an opposite surface of said vertical wall unit and forming a third layer added to said vertical wall portions, said seat bracket adapted to fix said seat cushion and including a seat belt attachment hole formed in a position on a same vertical plane as an engagement portion between said engagement toothed portion of said lower rail and said engagement piece portion of said lock plate, said upper rail, said lock plate and said seat bracket being situated at a central portion of a space formed between said downwardly-extended wall portions of said lower rail.

2. A seat slide device for automotive vehicles comprising a lower rail to be fixed to a floor panel of an automotive vehicle, an upper rail slidably fitted to said lower rail, a lock plate capable of locking, at a desired position, a sliding movement of said upper rail, said lock plate being pivotally supported by said upper rail, and a seat bracket for fixing a seat cushion, said seat bracket being secured to said upper rail, said lower rail including, when viewed in a direction of an end face thereof, two side wall portions bent upwardly from two sides of a bottom wall portion, top wall portions bent inwardly in mutually opposing directions like a fishing hook from upper ends of said side wall portions, and vertically-downwardly extending wall portions, said lower rail exhibiting a generally laterally symmetrical configuration with repsect to an imaginary vertical center line, said upper rail being comprised of a pair of generally L-shaped plates each of which includes a horizontal wall portion which is bent like a fishing hook from a lower end portion of a vertical wall portion and a raised wall portion, said pair of L-shaped plates being abutted with each other at back sides of said vertical wall portions and fixed together to form, into a vertical wall unit, said upper rail exhibiting a laterally symmetrical configuration with respect to the imaginary vertical center line, said vertical wall unit of said upper rail being situated at a central portion of a space formed between said opposing downwardly-extended wall portions of said lower rail and said raised walls being situated in spatial areas formed between said side wall portions and said downwardly-extended wall portions, said upper rail being longitudinally slidably fitted to said lower rail, said seat bracket forming a third layer with said vertical wall portions on a side of said wall unit opposite to the pivotal connection of said lock plate to said upper rail, said lock plate including an engagement piece portion disposed within a cut-out portion formed in said upper rail and adapted to engage with an engagement toothed portion formed on said downwardly-extended portion of said lower rail on a side of the seat, and said seat bracket including a seat belt attachment hole formed in a position on a same vertical plane as an engagement portion between said engagement toothed portion of said lower rail and said engagement piece portion of said lock plate.

* * * * *